(12) United States Patent
Zhao et al.

(10) Patent No.: US 11,203,055 B2
(45) Date of Patent: Dec. 21, 2021

(54) RIVETING ROBOT SYSTEM

(71) Applicant: MEISHAN CRRC FASTENING SYSTEM CO., LTD, Meishan (CN)

(72) Inventors: Xiangyun Zhao, Meishan (CN); Yu Liu, Meishan (CN); Tao Deng, Meishan (CN); Wei Li, Meishan (CN); Tao Yu, Meishan (CN); Long Guo, Meishan (CN); Shuai Zhang, Meishan (CN); Kun Li, Meishan (CN); Lin Yang, Meishan (CN)

(73) Assignee: MEISHAN CRRC FASTENING SYSTEM CO., LTD, Meishan (CN)

( * ) Notice: Subject to any disclaimer, the term of this patent is extended or adjusted under 35 U.S.C. 154(b) by 0 days.

(21) Appl. No.: 17/261,049

(22) PCT Filed: Sep. 12, 2019

(86) PCT No.: PCT/CN2019/105526
§ 371 (c)(1),
(2) Date: Jan. 18, 2021

(87) PCT Pub. No.: WO2020/248413
PCT Pub. Date: Dec. 17, 2020

(65) Prior Publication Data
US 2021/0291256 A1    Sep. 23, 2021

(30) Foreign Application Priority Data

Jun. 14, 2019 (CN) .......................... 201910515804.8

(51) Int. Cl.
*B21J 15/30* (2006.01)
*B25J 11/00* (2006.01)
(Continued)

(52) U.S. Cl.
CPC ............. *B21J 15/30* (2013.01); *B25J 11/007* (2013.01); *B65G 27/08* (2013.01); *F16F 15/08* (2013.01);
(Continued)

(58) Field of Classification Search
CPC .. B65G 27/00–04; B65G 27/08; B21J 15/022; B21J 15/043–045; B21J 15/105;
(Continued)

(56) References Cited

U.S. PATENT DOCUMENTS

| 4,765,175 A | * | 8/1988 | Denham ................ B21J 15/105 227/112 |
| 2005/0217097 A1 | * | 10/2005 | Solfronk ................ B21J 15/105 29/243.521 |

(Continued)

*Primary Examiner* — Matthew P Travers
(74) *Attorney, Agent, or Firm* — Houtteman Law LLC

(57) ABSTRACT

The present invention discloses a riveting robot, comprising: a robot part provided on a chassis, and detachably coupled with a riveting tool part through a hydraulically quick change disk; a visual position identification part provided on a side of the hydraulically quick change disk and secured on the sixth axis of the front end of the robot part; an automatic rivet feeding part provided on a mounting baseplate which is secured on a chassis through a two-stage vibration damping structure; a riveter tailing material collection part used for collecting tailing materials produced during riveting; a riveting quality judgment part used for collecting riveting data, and processing and generating a riveting curve to realize judgment of the riveting quality. A riveting robot system provided in the present invention can realize unmanned quick mounting of a pulling rivet at a specific riveting position; a vibration damping structure effectively isolates interference of riveting operation of a robot from a vibration source; radial and axial damping mechanisms can absorb axial and radial impact energies during the process of rivet pulling and mounting, ensuring that the operating accuracy of the riveting robot system and service life of the riveting robot mechanism.

9 Claims, 5 Drawing Sheets

(51) Int. Cl.
*F16F 15/08* (2006.01)
*B65G 27/08* (2006.01)
*B21J 15/02* (2006.01)
*B21J 15/32* (2006.01)
*B21J 15/04* (2006.01)
*B23P 19/00* (2006.01)
*B21J 15/20* (2006.01)

(52) U.S. Cl.
CPC ............ *B21J 15/022* (2013.01); *B21J 15/043* (2013.01); *B21J 15/20* (2013.01); *B21J 15/326* (2013.01); *B23P 19/004* (2013.01)

(58) Field of Classification Search
CPC ... B21J 15/20; B21J 15/28; B21J 15/30; B21J 15/326; B21J 15/38; B25J 11/007; B25J 19/0091; B25J 17/0225–0233; B23P 19/001–005; F16F 15/08
See application file for complete search history.

(56) References Cited

U.S. PATENT DOCUMENTS

| | | | |
|---|---|---|---|
| 2012/0267505 A1* | 10/2012 | Guest | F16F 7/1028 248/560 |
| 2016/0082598 A1* | 3/2016 | Anducas Aregall | B25J 9/1692 382/153 |
| 2016/0214475 A1* | 7/2016 | Rawlinson | B60L 50/51 |

* cited by examiner

RIVETING ROBOT SYSTEM

TECHNICAL FIELD

The present invention belongs to the technical field of riveting and fastening, and belongs to the technical field of designing and manufacturing smart devices for riveting and fastening in particular. The present invention especially relates to a smart device system for pulling rivet fastening and connection, and a riveting robot specifically, falling within the riveting type (B21J).

BACKGROUND ART

The pulling rivet fastening and connection technology has been widely applied in industries including railways, aviation, automobiles, vessels and so forth. However, during mounting and use thereof in large batches at fixed operating positions, operators shall hold riveting tools in hand for riveting. As for the case where there is a great amount of riveting, the operators shall make great efforts. Meanwhile, due to the operators' and inspectors' negligence, there may be problems such as missed riveting, missed inspection or erroneous inspection, bringing enormous hidden safety hazards.

The Chinese patent 201621343316.1 discloses an automatic riveting robot device, comprising a workbench provided with a fixture thereon. A rivet pulling mechanism is mounted on a side of the workbench. The riveting pulling mechanism comprises an assembly robot and a vibrating disk. The assembly robot is mounted thereon with a riveting mechanism which comprises a flip seat which is mounted thereon with an electric machine. The output shaft of the electric machine is mounted thereon with a riveting mounting plate where a riveting air cylinder and a feeding and rotating air cylinder are provided side by side. The piston of the riveting air cylinder is mounted thereon with a rivet pulling head, whose outer circumference is provided with an outer thread fitting with a rivet pulling nut. The piston of the feeding and rotating air cylinder is mounted thereon with a rotary material picking plate. The discharge port of the vibrating disk is mounted with a suction tube, whose end portion is connected with a feeding tube. The inner diameters of the suction tube and the feeding tube correspond to the size of a rivet pulling nut, and the outlet of the feeding tube corresponds to the arrangement of the material picking plate.

The patent can only be used in automatic riveting of rivet pulling nuts. The mounting tools are pneumatic riveting tools which cannot satisfy the requirements for automatic riveting of break-type pulling rivets.

SUMMARY OF THE INVENTION

The present invention discloses a riveting robot according to the deficiency of the prior art. The object of the present invention is to provide a riveting robot capable of carrying out unmanned and rapid mounting, realizing the functions including automatic change of a riveting tool part, automatic alignment of riveting position holes, automatic loading and binding, automatic riveting, automatic judgment of the riveting quality, storage, and so forth.

The technical solutions used in the present invention are as follows:

A riveting robot system consists of a robot part, a riveting tool part, and a visual position identification part, an automatic rivet feeding part, a riveter tailing material collection part, and a riveting quality judgment part, characterized in that:

the robot part is provided on a chassis, and is detachably coupled with a riveting tool part through a hydraulically quick change disk for completing mobile positioning of the whole space of the riveting tool;

the visual position identification part is provided on a side of the hydraulically quick change disk and is secured on the sixth axis of the front end of the robot part for photographically processing the riveting positions in an order of riveting and transmitting image information;

the automatic rivet feeding part is provided on a mounting baseplate which is mounted on a chassis through a two-stage vibration damping structure; comprising a vibrating disk and a rotating table for sending rivets in a direction to the position of a straight line segment, is then rotated for feeding by the rotating table, and completing accurate transmission and positioning of rivets from a compact arrangement manner to single pieces;

the riveter tailing material collecting part is used for collecting tailing materials produced during riveting; the riveting quality judgment part is used for collecting riveting data, and processing and generating a riveting curve to realize judgment of the riveting quality.

Further, with the two-stage vibration damping structure, the automatic rivet feeding part is first secured on a first-stage baseplate which is secured on a second-stage baseplate through a vibration damping seat which is secured on the chassis through the vibration damping seat.

Further, the vibration damping structure comprises a vibration damping nut, a vibration damping rubber mat, and a vibration damping bracket which are embedded and sleeved in sequence. The vibration damping nut has an inverted T structure. A T-shaped cross foot is embedded into a lateral groove on the underside of the vibration damping rubber mat, and is tightly fitted with each other and secured. The T-shaped vertical foot end portion is rotated with nuts, and is connected and secured with the chassis, and the periphery of the vertical foot is embedded into the vibration damping rubber mat, and is tightly fitted with each other and secured. The vibration damping bracket is a hollow shell structure with two wings which are provided with through-holes for connecting and securing bolts with the baseplate or chassis. The hollow shell structure matches with the contour structure of the vibration damping rubber mat to realize compression and fixation. Lower end faces of the vibration damping nut and the vibration damping bracket are secured with the baseplate or chassis through a vibration damping rubber mat.

Further, the riveting tool part is provided with a damping structure, and is rapidly and detachably coupled with the robot part through a hydraulically quick change disk. The damping structure comprises a radial damping structure and an axial damping structure.

Further, the radial damping structure consists of a damping device clamped and secured symmetrically on both sides of an oil cylinder body of the riveting tool part. The damping device consists of a radial damping baseplate, a radial damping rubber sheet, and a radial damping cover plate which are arranged in sequence.

Further, the axial damping structure consists of an axial damping baseplate, an axial damping sliding table, a damping guide rod, a damping air cylinder, a magnetic ring, and a magnetic rod. The axial damping baseplate is coupled and secured with an oil cylinder body. The axial damping baseplate is provided with two damping guide rods and a magnetic rod. The axial damping sliding table slides on the two damping guide rods, and both sides of the axial damping sliding table are coupled with the axial damping baseplate through a damping air cylinder. The axial damping sliding table is provided in the middle thereof with a magnetic ring which is slidably sleeved on the magnetic rod. The axial damping sliding table is coupled and secured with the radial damping cover plate of the radial damping mechanism.

Further, the axial damping baseplate at the top of the magnetic rod is provided with a hysteresis displacement sensor.

A hydraulic pump station providing the riveting force for the riveting tool is provided on a mounting baseplate.

The robot part comprises a robot seventh axis for lateral movements provided on the chassis. The pedestal of the robot part realizes lateral movements along the robot seventh axis through a mounting seat board. A robot sixth axis is provided on the pedestal of the robot part. The end portion of the robot sixth axis is rapidly and detachably coupled with the riveting tool part through a hydraulically quick change disk for realizing omnidirectional movement.

The robot part in the present invention comprises a robot mounting seat board. A vibrating disk discharging and feeding structure and a hydraulic station are mounted on a mounting baseplate: the two parts are connected with each other with a flexible connector. Moreover, the vibrating disk discharging and feeding structure and a hydraulic station and the mounting baseplate use two-stage vibration damping therebetween, and then are mounted on a chassis, which isolates a vibration source to the utmost, and reduces the effect of the vibration source on the accuracy of the robot.

The automatic rivet feeding part in the present invention comprises a vibrating disk and a rotating table. The vibrating disk sends a rivet in a direction to the position of a straight line segment, and is then rotated for feeding by the rotating table, and completes the function of accurately positioning rivets from a compact arrangement manner to single pieces.

The riveting tool part in the present invention is rapidly mounted with and dismounted from the robot sixth axis through a hydraulically quick change disk. The riveting tool part uses a symmetric structure on both sides, and is supported elastically such that the impact is absorbed and offset completely when rivets are fractured.

The visual position identification part in the present invention comprises a camera device and a fixed anti-vibration structure. The visual position identification part is provided on a side of the quick change disk and secured on the robot sixth axis. The lens of the camera device of the visual position identification part and the gun head of the riveting tool part are flush and aligned with a mounting position hole.

The riveting quality judgment part in the present invention comprises a hydraulic pump station and an upper computer control system. A pressure sensor collects data regarding riveting oil pressures, and a flow gauge collects data regarding hydraulic oil flows at the oil return opening. The upper computer control system is responsible for processing and converting the data regarding riveting oil pressures and the data regarding hydraulic oil flows at the oil return opening, generating a riveting curve, and judging the riveting quality. When riveting is qualified, data is stored and statements are printed, while when riveting is not qualified, an alarm is given.

The radial damping structure in the riveting tool part of the present invention uses a symmetric structure on both sides, and is supported elastically. Said damping structure adopts a symmetric mounting mode on both the right and the left sides, and can completely absorb and offset impacts when rivets are fractured.

The axial damping structure of the riveting tool part is supported with an air pressure as a constant force, and monitors the position of the axial damping structure through a hysteresis expansion displacement sensor. The axial damping structure is used for absorbing displacement of a rivet during riveting due to riveting deformation, which may allow the robot not to follow through during the whole riveting process, and reduce difficulties of system control. Meanwhile, as the axial damping distance is long, the position of the displacement sensor of the rivet may be monitored during assembly and riveting thereof. Whether a rivet is loaded abnormally is monitored from a side, and abnormal riveting is found from the side.

A multi-stage rotating joint is used for the riveting tool part, comprising a 360-degree linear rotating joint disposed at an angle of 90 degrees between a pipeline and a hydraulically quick change disk and mounted on the pipeline such that joints of the robot can be flexibly adapted to positions at respective angles during rotation and other processes, and the problem of poor flexibility due to a hydraulic high-pressure pipeline is solved.

When the equipment in the present invention is applied, after the riveting robot system is started, the specifications of a riveting position hole and a rivet are arranged. The robot automatically selects the riveting tool part for rapid change. The automatic rivet feeding part completes feeding of rivets. The riveting tool part automatically grasps a rivet. The robot part returns to the original point. The robot control system, after receiving a riveting coordinate point, automatically moves to capture a riveting position. The visual position identification part identifies the riveting position hole and calibrates the position thereof. The riveting robot system starts the hydraulic pump station and completes mounting of a rivet. The riveting quality judgment system collects riveting data, generates a riveting curve, and completes judgment of the riveting quality. The riveter tailing material collection part pours out a tailing material. The robot part returns to the original point. Riveting is completed.

The beneficial effects of the present invention are as follows: the riveting robot system provided in the present invention can realize unmanned quick mounting of a pulling rivet at a specific riveting position, and can realize functions during operation including automatic change of the riveting tool part, automatic alignment of riveting position holes, automatic loading and binding, automatic riveting, and automatic judgment of the riveting quality, storage, and so forth. The vibration damping structure in the prevent invention effectively isolates interference of riveting operation of a robot from a vibration source, improve the riveting accuracy and improve the operating state of the robot. The vibration damping structure is simple and effective. The radial and axial damping mechanisms can absorb axial and radial impact energies during the process of rivet pulling and mounting, ensuring that the operating accuracy of the riveting robot system and service life of the riveting robot mechanism.

Figure 1:
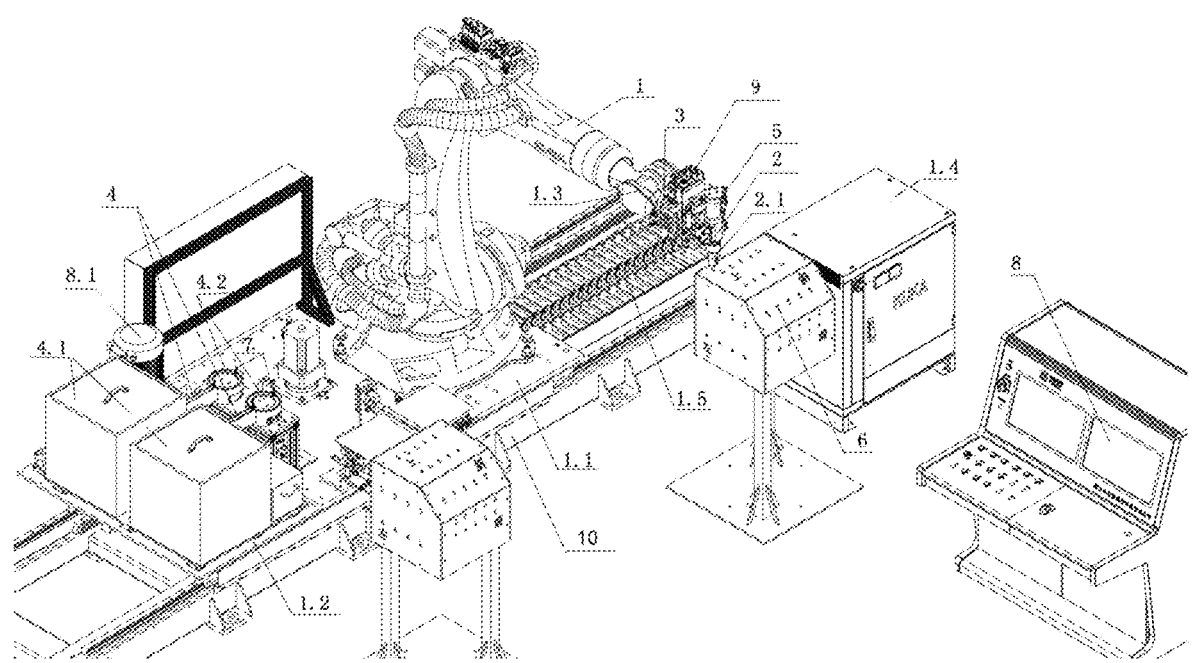
FIG. 1 is an arrangement diagram of the main assembly of a riveting robot system in the present invention.

In the figures: 1—robot part; 2—riveting tool part; 3—visual position identification part; 4—automatic rivet feeding part; 5—riveter tailing material collection part; 6—riveting position hole; 7—rivet; 8—riveting quality judgment part; 9—hydraulically quick change disk; 10—chassis; 1.1—mounting seat board; 1.2—mounting baseplate; 1.3—robot sixth axis; 1.4—robot control system; 1.5—robot seventh axis; 1.6—vibration damping rubber mat; 1.7—vibration damping bracket; 1.8—vibration damping nut; 2.1—gun head; 2.2—hoop structure; 2.3—cylinder body; 2.4—tailing material collection shell; 2.5—oil intake tube; 2.6—oil return tube; 2.7—radial damping structure; 2.8—axial damping structure; 2.7a—radial damping baseplate; 2.7b—radial damping rubber sheet; 2.7c—radial damping cover plate; 2.8a—axial damping baseplate; 2.8b—axial damping sliding table; 2.8c—damping guide rod; 2.8d—damping air cylinder; 2.8e—damping bearing; 2.8f—a sensor cover plate; 2.8g—hinge plate; 2.8h—bracket; 2.8i—magnet ring; 2.8j—magnetic rod; 4.1—vibrating disk; 4.2—rotating table; 8.1—hydraulic pump station.

EMBODIMENTS

The present invention was specifically described through embodiments which were only used for further explaining the present invention, and could not be understood as limiting the scope of protection of the present invention. Some non-substantive improvements and adjustments made by a person skilled in the art according to the contents in the present invention also fell within the scope of protection of the present invention.

The figures were combined.

A riveting robot system comprised: a robot part 1, a riveting tool part 2, a visual position identification part 3, an automatic rivet feeding part 4, a riveter tailing material collection part 5 and a riveting quality judgment part 8. After the riveting robot system was started, the specifications of a riveting position hole 6 and a rivet 7 were arranged. The robot automatically selected the riveting tool part 2 for quick change. The automatic rivet feeding part 4 completed feeding of rivet 7. The riveting tool part 2 automatically grasped the rivet 7. The robot part 1 returned to the original point. The robot control system 1.4, after receiving a riveting coordinate point, automatically moved to capture a riveting position hole 6. The visual position identification part 3 identified the riveting position hole 6 and calibrated the position thereof. The riveting robot control system 1.4 started the hydraulic pump station 8.1 and completed mounting of rivet 7. The riveting quality judgment system 8 collected riveting data, generated a riveting curve, and completed judgment of the riveting quality. The riveter tailing material collection part 5 poured out a tailing material. The robot part 1 returned to the original point. Riveting was completed.

Respective systems and uses in the present invention were explained as follows:

1) The riveting robot system was configured as follows:

The robot seventh axis 1.5 was arranged with the following parts: a robot mounting seat board 1.1, and a vibrating disk discharging and feeding structure and a hydraulic mounting baseplate 1.2. A flexible connector was used for connecting the two mounting boards. Moreover, the vibrating disk 4.1 and the discharging and feeding structure, and the hydraulic pump station 8.1 and the mounting baseplate 1.2 used two-stage vibration damping therebetween, and then are mounted on the mounting baseplate 1.2, which isolated a vibration source to the utmost, and reduced the effect of the vibration source on the accuracy of the robot. Said two-stage vibration damping structure mainly comprised a vibration damping nut 18 in an inverted T structure, a vibration damping rubber mat 16 and a vibration damping bracket 17. The vibration damping nut 18 in an inverted T structure was connected with a machine that needed vibration damping by nuts. The large head area of an inverted T nut was large, and could effectively reduce the pressure of the vibration damping rubber mat 16 in case of load bearing, and improve the load-bearing capability of the vibration damping rubber mat 16. An embedded annular vibration damping bracket 17 could effectively improve the anti-bending and anti-torsion capabilities of the vibration damping rubber mat 16 in case of uneven pressure, enhance the stability of the vibration damping rubber mat 16, and ensure that the machine could operate stably. The pedestal of the vibrating disk was connected with vibration damping nuts 18 of a plurality of vibration damping rubber mats 16 reasonably distributed on the rack by means of bolts, and was connected to the chassis 10 through two straight-through holes at the bottom of the vibration damping rubber mat 16.

The robot seventh axis was provided thereon with the following parts: an automatic riveting loading part 4 comprising a vibrating disk 4.1 and a rotating table 4.2. The vibrating disk 4.1 sent rivet 7 in a direction to the position of a straight line segment, was then rotated for feeding by the rotating table 4.2, and completed the function of accurately positioning rivet 7 from a compact arrangement manner to single pieces.

The robot sixth axis was provided thereon with the following part: a riveting tool part 2 which was rapidly mounted with and dismounted from the robot sixth axis 1.3 through a hydraulically quick change disk 9. The hydraulically quick change disk located on the riveting tool part 2 was a female disc. Oil pipelines were connected with an oil intake tube 2.5 and an oil return tube 2.6 of the riveting tool part 2, respectively. The structure was connected and secured with the riveting tool part 2 through screws. The hydraulically quick change disk 9 located on a mechanical arm of the riveting robot was a male disc. The oil pipelines were connected with an oil intake tube and an oil return tube of the hydraulic pump station, respectively. When the riveting tool part 2 was mounted rapidly, the oil pipeline male connector and female connector of the female disc and male disc were linked up. The riveting robot controlled starting of an air source by programs, and the balls of the male disc and the female disc were dead locked, realizing mounting and fixation. Otherwise, during disassembly, the oil pipelines were decompressed, the air source was closed, and the balls were reset, completing disassembly. The riveting tool part 2 used a symmetric structure on both sides, and was supported elastically such that the impact was absorbed and offset completely when rivets 7 were fractured.

The robot sixth axis 1.3 was provided thereon with the following part: a visual position identification part 3 which comprised a camera device and a camera mounting and securing structure. The visual position identification part 3 was mounted on a side of the quick change disk 9 and was secured on the robot sixth axis 1.3. The lens of the camera device of the visual position identification part 3 and the gun head 2.1 of the riveting tool part 2 were flush and aligned with a mounting position hole.

The riveting robot system was provided with the following part: a riveting quality judgment part 8: the riveting quality judgment part 8 comprised a hydraulic pump station 8.1 and an upper computer control system. A pressure sensor collected data regarding riveting oil pressures, and a flow gauge collected data regarding hydraulic oil flows at the oil return opening. The upper computer control system was responsible for processing and converting the data regarding riveting oil pressures and the data regarding hydraulic oil flows at the oil return opening, generating a riveting curve, and judging the riveting quality. When riveting was qualified, data was stored and statements were printed, while when riveting was not qualified, an alarm was given.

2) The riveting robot system was started for POST (power on self test). The robot part 1 without an alarm signal automatically returned to the original point, and shall return to the original point in case that there was an alarm signal. A riveting signal was input. The riveting robot system judged the riveting model according to the signal, and automatically changed the riveting tool part 2.

3) The automatic rivet feeding part 4 was started. Rivet 7 was sent in a direction to the position of a straight line segment by vibrating disk 4.1, and was then rotated for feeding by the rotating table 4.2. The function of accurately positioning rivet 7 from a compact arrangement manner to single pieces was completed.

4) The riveting tool part 2 moved to the position of the automatic rivet feeding part 4 with the robot part 1, accurately identified the position of rivet 7, completed grasp of the rivet 7, and returned to the original point together with the robot part 1 subsequently.

5) The riveting robot control system 1.4 controlled movement of the robot part 1 to the neighborhood of the riveting position hole 6. The visual position identification part 3 carried out photographic processing, and made the position of a rivet mounting hole accurate.

6) The riveting tool part 2 completed binding of rivet 7 with the robot part 1, started the hydraulically pump station 8.1, and completed riveting of rivet 7.

7) The riveting quality judgment part 8 completed collection of riveting data, and processed and generated riveting curves, realizing judgment of the riveting quality.

The riveting robot system in the present invention was provided thereon with the following parts: a riveting tool part 2 and a radial damping structure 2.7 which used a symmetric structure on both sides and was supported elastically. Said damping structure used a symmetric mounting form on both the left and the right sides, and could completely absorb and offset impacts produced radially during riveting and fracture.

The following arrangement was made: a riveting tool part 2 and an axial damping structure 2.8 with an air pressure as a support for constant force. The position of the axial damping structure 2.8 was monitored through a hysteresis expansion displacement sensor. The axial damping structure 2.8 was used for absorbing displacement of rivet 7 during riveting due to riveting deformation, which may allow the robot not to follow through during the whole riveting process, and reduce difficulties in controlling a system. Meanwhile, as the axial damping distance was long, the position of the displacement sensor of the rivet 7 was monitored during assembly and riveting thereof, and whether a rivet was loaded abnormally was monitored from a side, and abnormal riveting was found from the side. The radial damping structure 2.7 comprised a radial damping baseplate 2.7a, a radial damping rubber sheet 2.7b and a radial damping cover plate 2.7c. The radial damping baseplate 2.7a was a hollow interior steel structure, and was mounted on the symmetric position on both sides of the cylinder body 2.3. The radial damping rubber sheet 2.7b was a cross rubber sheet structure located between the radial damping baseplate 2.7a and the radial damping cover plate 2.7c, capable of absorbing the impact energies when the hydraulic riveting tool was operating. The radial damping cover plate 2.7c could realize fixation of the radial damping baseplate 2.7a and the radial damping rubber sheet 2.7b, and was mounted on the axial damping sliding table 2.8b. The axial damping structure 2.8 comprised an axial damping baseplate 2.8a, an axial damping sliding table 2.8b, a damping guide rod 2.8c, a damping air cylinder 2.8d, a damping bearing 2.8e, and a hysteresis displacement sensor. With the axial damping baseplate 2.8a, the axial damping mechanism 2.8 and the other parts of the hydraulic riveting tool 2 were mounted on the hydraulically quick change disk 9 through screws to ensure that the hydraulic riveting tool 2 was integral with the hydraulically quick change disk 9 all the time during change and use, guaranteeing the automatic and quick change of the riveting tool. One end of the axial damping sliding table 2.8b was connected with the axial damping baseplate 2.8a through the damping guide rod 2.8c and the damping bearing 2.8e, while the other end thereof was connected with the riveter oil cylinder 2.3 through the radial damping cover plate 2.7c. One end of the damping air cylinder 2.8d was connected with the axial damping baseplate 2.8a through a hinge plate 2.8g, while the other end thereof was connected with the axial damping sliding table 2.8b through a bracket 2.8h. The magnetic rod 2.8j of the hysteresis displacement sensor was connected with the axial damping baseplate 2.8a through a sensor cover plate 2.8f. The magnetic ring 2.8i was secured on the axial damping sliding table 2.8b.

The arrangement was made as follows: a multi-stage rotating joint was used for the riveting tool part 2, comprising a 360-degree linear rotating joint disposed at an angle of 90 degrees between a pipeline and a hydraulic quick change disk 9 and mounted on the pipeline such that joints of the robot could by flexibly adapted to positions at respective angles during rotation and other processes, and the problem of poor flexibility due to a hydraulic high-pressure pipeline was solved.

The arrangement was made as follows: the automatic rivet feeding part 4 comprised a vibrating disk 4.1 and a rotating table 4.2. The vibrating disk 4.1 sent rivets in a direction to the position of a straight line segment, then was rotated for feeding by the rotating table, and completed the function of accurately positioning rivets from a compact arrangement manner to single pieces.

The arrangement was made as follows: the visual position identification part 3 comprised a camera device 3.1 and a camera mounting and securing structure 3.2. The visual position identification part 3 was mounted on a side of the hydraulically quick change disk 9, and was secured together on the robot sixth axis 1.3. The lens of the camera device 3.1 of the visual position identification part 3 and the gun head 2.1 of the riveting tool part 2 were flush and aligned with a riveting position hole 6.

The arrangement was made as follows: the riveting quality judgment part 8 comprised a hydraulic pump station 8.1 and an upper computer control system. A pressure sensor collected data regarding riveting oil pressures, and a flow gauge collected data regarding hydraulic oil flows at the oil return opening. The upper computer control system was responsible for processing and converting the data regarding riveting oil pressures and the data regarding hydraulic oil flows at the oil return opening, generating a riveting curve, and judging the riveting quality. When riveting was qualified, data was stored and statements were printed, while when riveting was not qualified, an alarm was given.

As shown in FIG. 1, the system comprised: a robot part 1, a riveting tool part 2, a visual position identification part 3, an automatic rivet feeding part 4, a riveter tailing material collection part 5 and a riveting quality judgment part 8. After the riveting robot system was started, the specifications of a riveting position hole 6 and a rivet 7 were arranged. The robot automatically selected the riveting tool part 2 for quick change. The automatic rivet feeding part 4 completed feeding of rivet 7. The riveting tool part 2 automatically grasped rivet 7. The robot part 1 returned to the original point. The robot control system 1.4, after receiving a riveting coordinate point, automatically moved to capture a riveting position hole 6. The visual position identification part 3 identified the riveting position hole 6 and calibrated the position thereof. The riveting robot control system 1.4 started the hydraulic pump station 8.1 and completed mounting of rivet 7. The riveting quality judgment system 8 collected riveting data, generated a riveting curve, and completed judgment of the riveting quality. The riveter tailing material collection part 5 poured out a tailing material. The robot part 1 returned to the original point. Riveting was completed.

Figure 2:
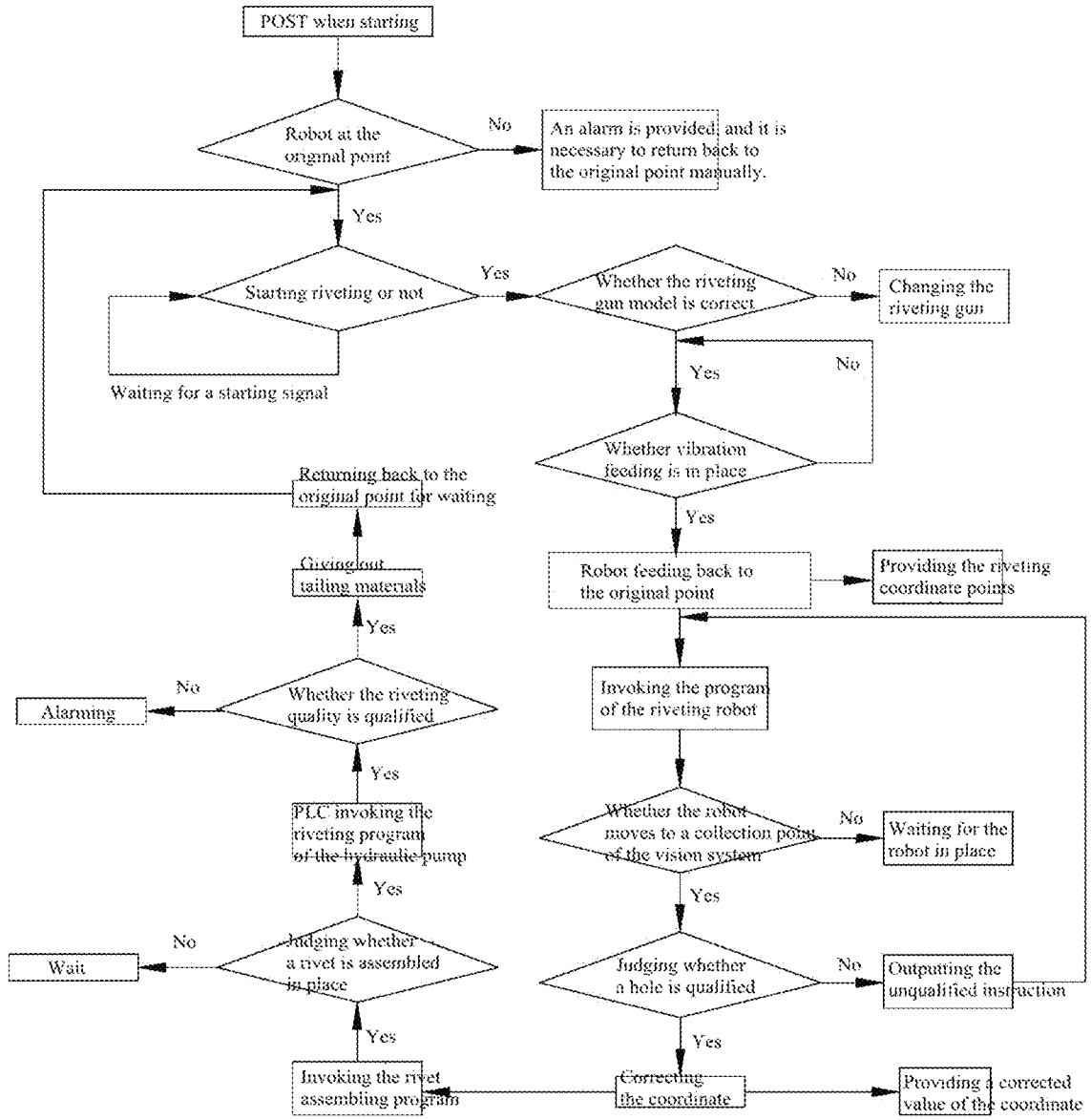
FIG. 2 is a flow chart of control of a riveting robot in the present invention.

As shown in FIG. 2, the riveting robot system was started for POST. The robot part 1 without an alarm signal automatically returned to the original point, and shall return to the original point in case that there was an alarm signal. A riveting signal was input. The riveting robot system judged the riveting model according to the signal, and automatically changed the riveting tool part 2. The automatic rivet feeding part 4 was started where the vibrating disk 4.1 first sent rivet 7 to the position of a straight line segment in a direction, and was then rotated for feeding by the rotating table 4.2. The function of accurately positioning rivets 7 from a compact arrangement manner to single pieces was completed. The riveting tool part 2 moved to the position of the automatic rivet feeding part 4 with the robot part 1, accurately identified the position of rivet 7, completed grasp of the rivet 7, and returned to the original point together with the robot part 1 subsequently. The riveting robot control system 1.4 controlled movement of the robot part 1 to the neighborhood of the riveting position hole 6. The visual position identification part 3 carried out photographic processing, and made the position of a rivet mounting hole accurate. The riveting tool part 2 completed binding of rivet 7 with the robot part 1, started the hydraulic pump station 8.1, and completed riveting of rivet 7. The riveting quality judgment part 8 completed collection of riveting data, and processed and generated a riveting curve, realizing judgment of the riveting quality.

Figure 3:
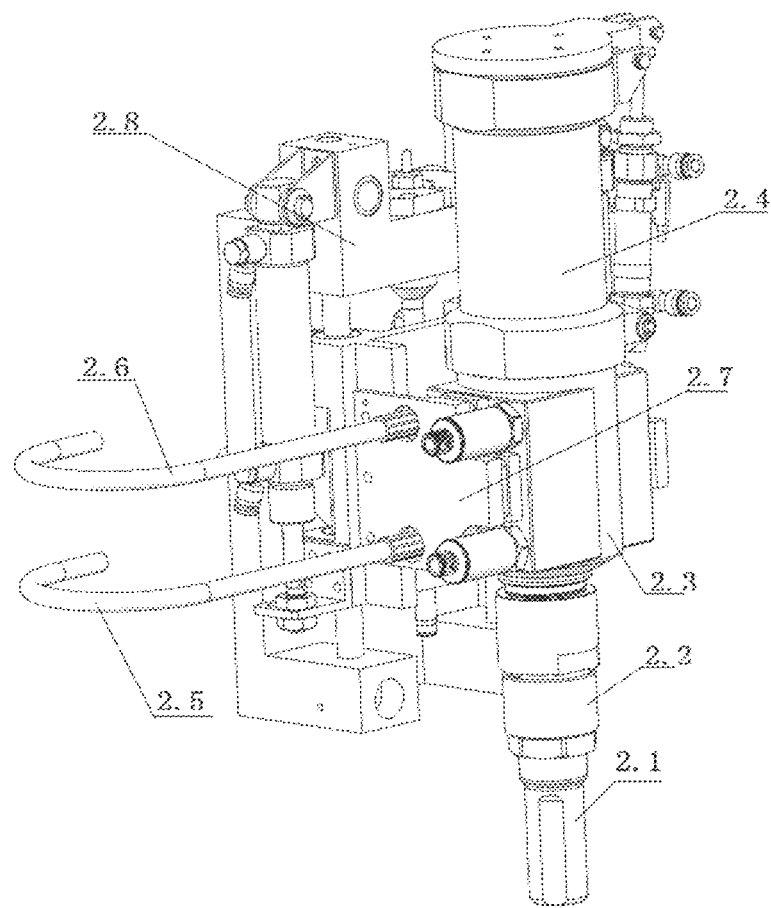
FIG. 3 is a schematic diagram of a local structure of a riveting tool in the present invention.

As shown in FIG. 3, a hydraulically riveting tool part 2 comprised a gun head 2.1, a hoop structure 2.2, a riveter oil cylinder 2.3, a tailing material collection shell 2.4, an oil intake tube 2.5, an oil return tube 2.6, a radial damping mechanism 2.7, and an axial damping mechanism 2.8.

Figure 4:
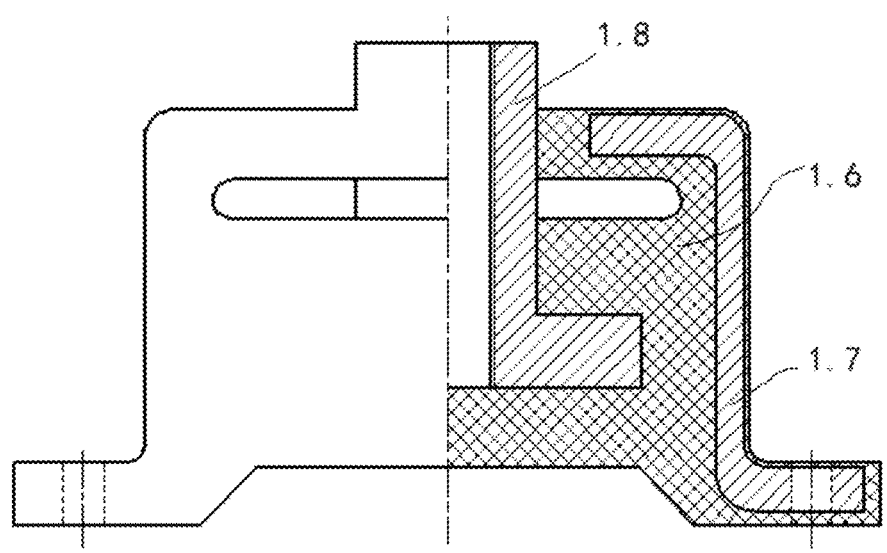
FIG. 4 is a schematic diagram of a vibration damping structure in the present invention.
Figure 5:
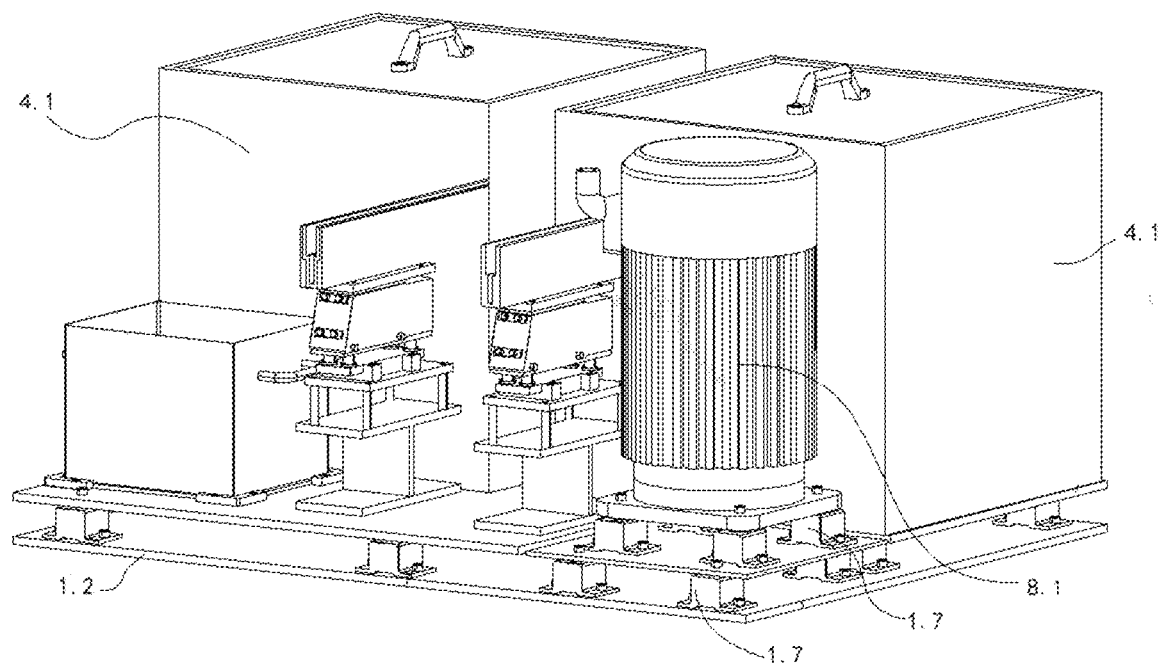
FIG. 5 is a local schematic diagram of a vibration damping and mounting structure in the present invention.

As shown in FIGS. 4 and 5, a two-stage vibration damping structure comprised a vibration damping nut 1.8, a vibration damping rubber mat 1.6, and a vibration damping bracket 1.7, wherein the vibration damping nut 1.8 had an inverted T structure, and the vibration damping rubber mat 1.6 had a hollow cylindrical structure with a baseplate. The upper plane of the baseplate had a groove matching with an inverted T structure for embedding a fixed T foot.

The hollow cylindrical structure was tightly bound and secured with the vibration damping nut 1.8. The vibration damping bracket 1.7 had two wings for securing the same with a mounting baseplate 1.2 through bolts. The inner cavity of the vibration damping bracket 1.7 matched with the contour of the vibration damping rubber mat 1.6. The vibration damping nut 1.8 was embedded with the vibration damping rubber mat 1.6 through an inverted T foot end, and was secured through the vibration damping bracket 1.7.

Figure 6:
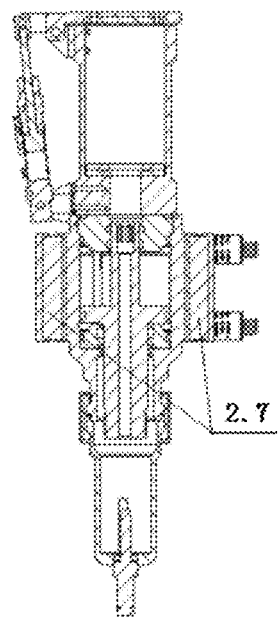
FIG. 6 is a local section diagram of a radial damping structure in the present invention.
Figure 7:
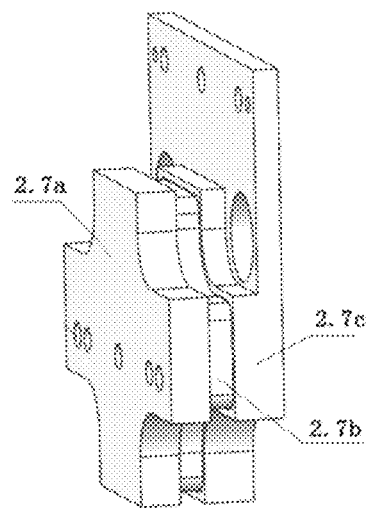
FIG. 7 is a schematic diagram of the structure of a radial damping structure assembly in the present invention.

As shown in FIGS. 6 and 7, a radial damping structure 2.7 comprised a radial damping baseplate 2.7a, a radial damping rubber sheet 2.7b and a radial damping cover plate 2.7c. The radial damping baseplate 2.7a was a hollow interior steel structure, and was mounted on a symmetric position on both sides of the cylinder body 2.3. The radial damping rubber sheet 2.7b was a cross rubber sheet structure located between the radial damping baseplate 2.7a and the radial damping cover plate 2.7c, and could absorb impact energies when the hydraulic riveting tool part 2 was operating. The radial damping cover plate 2.7c could realize fixation of the radial damping baseplate 2.7a and the radial damping rubber sheet 2.7b, and was mounted on the axial damping sliding table 2.8b.

Figure 8:
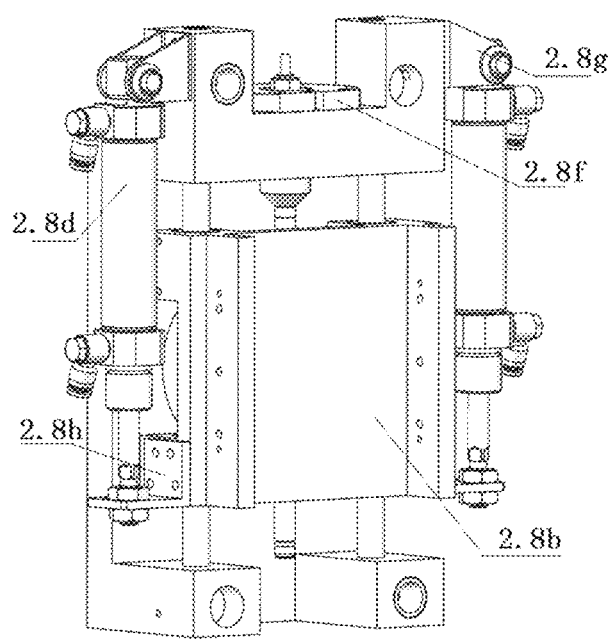
FIG. 8 is a schematic diagram of a side view structure of an axial damping structure in the present invention.
Figure 9:
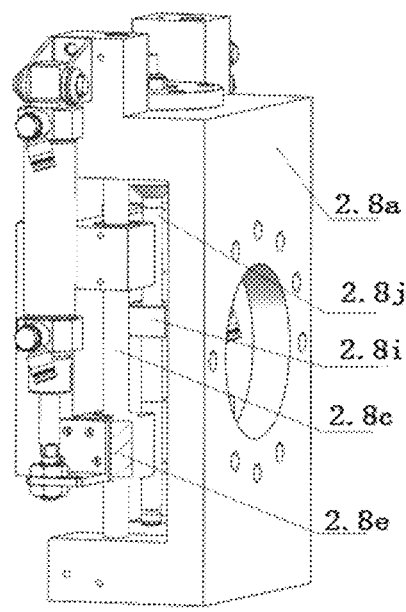
FIG. 9 is a schematic diagram of the other side view structure of an axial damping structure in the present invention.

As shown in FIGS. 8 and 9, an axial damping mechanism 2.8 comprised an axial damping baseplate 2.8a, an axial damping sliding table 2.8b, a damping guide rod 2.8c, a damping air cylinder 2.8d, a damping bearing 2.8e, and a hysteresis displacement sensor. With the axial damping baseplate 2.8a, the axial damping mechanism 2.8 and the other parts of the hydraulic riveting tool 2 were mounted on the hydraulic quick change disk 9 through screws to ensure that the hydraulic riveting tool 2 was integral with the hydraulically quick change disk 9 all the time during change and use, guaranteeing the automatic and quick change of the riveting tool. One end of the axial damping sliding table 2.8b was connected with the axial damping baseplate 2.8a through the damping guide rod 2.8c and the damping bearing 2.8e, while the other end thereof was connected with the riveter oil cylinder 2.3 through the radial damping cover plate 2.7c. One end of the damping air cylinder 2.8d was connected with the axial damping baseplate 2.8a through a hinge plate 2.8g, while the other end thereof was connected with the axial damping sliding table 2.8b through a bracket 2.8h. The magnetic rod 2.8j of the hysteresis displacement sensor was connected with the axial damping baseplate 2.8a through a sensor cover plate 2.8f. The magnetic ring 2.8i was secured on the axial damping sliding table 2.8b.

The invention claimed is:

1. A riveting robot system comprising a robot part, a riveting tool part, a visual position identification part, an automatic rivet feeding part, a riveter tailing material collection part, and a riveting quality judgment part, wherein:
   the robot part is provided on a chassis, and is detachably coupled with the riveting tool part through a hydraulic quick change disk for completing mobile positioning of the riveting tool;

the visual position identification part is provided on a side of the hydraulic quick change disk and secured on a sixth axis of a front end of the robot part for photographically processing riveting positions in an order of riveting and transmitting image information;

the automatic rivet feeding part is provided on a mounting baseplate which is secured on the chassis through a two-stage vibration damping structure, the automatic rivet feeding part further comprising a vibrating disk and a rotating table for sending rivets in a direction a position of a straight line segment, then rotating for feeding by the rotating table, and completing transmission and positioning of rivets to single pieces;

the riveter tailing material collection part is used for collecting tailing materials produced during riveting;

the riveting quality judgment part is used for collecting riveting data, and processing and generating a riveting curve to realize judgment of the riveting quality.

2. The riveting robot system according to claim 1, wherein with the two-stage vibration damping structure, the automatic rivet feeding part is secured on a first-stage baseplate which is secured on a second-stage baseplate through a vibration damping seat, and the second-stage baseplate is secured on the chassis through another vibration damping seat.

3. The riveting robot system according to claim 2, wherein the vibration damping seat consists of a vibration damping nut, a vibration damping rubber mat, and a vibration damping bracket which are embedded sequentially; the vibration damping nut has an inverted T structure; a T-shaped cross foot is embedded into a lateral groove on an underside of the vibration damping rubber mat, and they are fitted with each other and secured; a T-shaped vertical foot end portion is connected and secured with the baseplate or chassis, and a periphery of the vertical foot is embedded into the vibration damping rubber mat, and they are fitted with each other and secured; the vibration damping bracket is a hollow shell structure with two wings which are provided with through-holes for connecting and securing bolts with the baseplate or chassis; the hollow shell structure matches with a contour structure of the vibration damping rubber mat to realize compression and fixation; lower end faces of the vibration damping nut and the vibration damping bracket are damped and secured with the baseplate or chassis through the vibration damping rubber mat.

4. The riveting robot system according to claim 1, wherein the riveting tool part is provided with a damping structure and is detachably coupled with the robot part through the hydraulic quick change disk, the damping structure comprising a radial damping structure and an axial damping structure.

5. The riveting robot system according to claim 4, wherein the radial damping structure consists of a damping device clamped and secured symmetrically on two sides of an oil cylinder body of the riveting tool part, the damping device consisting of a radial damping baseplate, a radial damping rubber sheet, and a radial damping cover plate which are arranged in sequence.

6. The riveting robot system according to claim 5, wherein the axial damping structure consists of an axial damping baseplate, an axial damping sliding table, two damping guide rods, a damping air cylinder, a magnetic ring, and a magnetic rod; the axial damping baseplate is coupled and secured with the oil cylinder body, and the axial damping baseplate is provided with the two damping guide rods and the magnetic rod; the axial damping sliding table slides on the two damping guide rods, and two sides of the axial damping sliding table are coupled with the axial damping baseplate through the damping air cylinder; the axial damping sliding table is provided in the middle thereof with the magnetic ring which is slidably sleeved on the magnetic rod; the axial damping sliding table is coupled and secured with the radial damping cover plate of the radial damping mechanism.

7. The riveting robot system according to claim 6, wherein the axial damping baseplate at a top of the magnetic rod is provided with a hysteresis displacement sensor.

8. The riveting robot system according to claim 1, wherein the robot part comprises a robot seventh axis for lateral movement provided on the chassis, and a pedestal of the robot part realizes lateral movements along the robot seventh axis through a mounting seat board; the robot sixth axis is provided on the pedestal of the robot part; an end portion of the robot sixth axis is detachably coupled with the riveting tool part through the hydraulic quick change disk for realizing omnidirectional movement.

9. The riveting robot system according to claim 1, wherein a hydraulic pump station providing a riveting power to the riveting tool is provided on the mounting baseplate.

* * * * *